(12) United States Patent
Fledersbacher et al.

(10) Patent No.: US 6,481,205 B2
(45) Date of Patent: Nov. 19, 2002

(54) EXHAUST GAS TURBOCHARGER FOR AN INTERNAL COMBUSTION ENGINE AND A METHOD FOR OPERATING AN EXHAUST GAS TURBOCHARGER

(75) Inventors: Peter Fledersbacher, Stuttgart (DE); Paul Löffler, Stuttgart (DE); Siegfried Sumser, Stuttgart (DE); Friedrich Wirbeleit, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/974,713

(22) Filed: Oct. 10, 2001

(65) Prior Publication Data

US 2002/0041813 A1 Apr. 11, 2002

(30) Foreign Application Priority Data

Oct. 11, 2000  (DE) .......................................... 100 50 161

(51) Int. Cl.$^7$ ............................................... F02B 33/44
(52) U.S. Cl. ........................................ 60/605.1; 60/608
(58) Field of Search ................................ 60/605.1, 607, 60/608

(56) References Cited

U.S. PATENT DOCUMENTS

| 4,656,975 | A | * | 4/1987 | Johnson ................... 123/41.68 |
| 5,771,695 | A | * | 6/1998 | Halimi ........................ 60/608 |
| 5,904,471 | A | * | 5/1999 | Woollenweber et al. .... 417/371 |
| 6,029,452 | A | | 2/2000 | Halimi et al. |
| 6,220,234 | B1 | * | 4/2001 | Baker et al. ............... 60/605.1 |
| 6,305,169 | B1 | * | 10/2001 | Mallof ........................ 60/608 |
| 6,327,857 | B1 | * | 12/2001 | Fredriksson ............... 60/605.3 |

* cited by examiner

*Primary Examiner*—Hoang Nguyen
(74) *Attorney, Agent, or Firm*—Klaus J. Bach

(57) ABSTRACT

In an exhaust gas turbocharger for an internal combustion engine having an air intake duct and an exhaust duct and wherein the turbocharger includes a compressor arranged in the air intake duct and a turbine arranged in the exhaust duct and a shaft carrying the turbine wheel and the compressor impeller, an electric motor is provided which includes a rotor provided with an air mover disposed in the inlet area of the compressor and being controllable for rotation independently of the rotation of the turbine.

15 Claims, 6 Drawing Sheets

EXHAUST GAS TURBOCHARGER FOR AN INTERNAL COMBUSTION ENGINE AND A METHOD FOR OPERATING AN EXHAUST GAS TURBOCHARGER

BACKGROUND OF THE INVENTION

The invention relates to an exhaust gas turbocharger for an internal combustion engine and a method for operating an exhaust gas turbocharger with a turbine which is disposed in an exhaust duct and a compressor which is disposed in an engine intake duct and operatively connected to the turbine by a shaft which is rotatably supported by a bearing housing and wherein an electric motor is integrated into the bearing housing of the exhaust gas turbocharger and includes a rotor which is disposed co-axially with the shaft.

Such an exhaust gas turbocharger is disclosed in U.S. Pat. No. 6,023,452. The exhaust gas turbocharger includes an electric motor, which is energized during low load and speed operation of the engine for driving the charger to increase the speed of the turbocharger. The electric motor is arranged on the shaft between the compressor and the turbine and is firmly connected to the shaft for rotation therewith. Upon energization of the electric motor, a driving force is applied to the shaft and the compressor by the electric motor in addition to that applied by the turbine so that already at low engine load and speed an increased charge air pressure can be generated for increasing the engine power output.

With such an exhaust gas turbocharger, the compressor out-put can be increased by the electric motor in a controlled manner. However, every time the electric motor is activated, it is also necessary to accelerate also the turbine shaft and the turbine wheel together with the impeller of the compressor. These components, that is, the turbine wheel and the turbine shaft, however have generally a substantially higher moment of inertia than the impeller of the compressor and therefore require a high electric energy input for their acceleration by the electric motor. Because of the high moment of inertia, the exhaust gas turbocharger also has a slow response behavior under transient operating conditions. To improve the response of such an exhaust gas turbocharger, a large electric motor is required which however further increases the moment of inertia and, furthermore, has high electric power requirements.

It is therefore the object of the present invention to provide an exhaust gas turbocharger with an auxiliary electric motor drive, which has relatively low electric power requirements and with which the transient behavior of the exhaust gas turbocharger is improved.

SUMMARY OF THE INVENTION

In an exhaust gas turbocharger for an internal combustion engine having an air intake duct and an exhaust duct and wherein the turbocharger includes a compressor arranged in the air intake duct and a turbine arranged in the exhaust duct and a shaft carrying the turbine wheel and the compressor impeller, an electric motor is provided which includes a rotor provided with an air mover disposed in the inlet area of the compressor and being controllable for rotation independently of the rotation of the turbine.

The air mover forms a component additional to the compressor impeller and can be operated independently of the turbine wheel. The rotor of the electric motor drive operates the air mover. However, since there is no rigid connection in the motion transmission path between the air mover and the turbine wheel, the electric motor and, together therewith, the air mover can be operated independently of the movement of the turbine wheel. The movement of the rotor and the movement of the turbine are uncoupled. This has the advantage that, upon operation of the electric motor, the turbine wheel with its relatively high mass does not also have to be accelerated so that the energy requirements for the electric motor are relatively small.

With the air mover, the compressor can pump more combustion air and the air can be compressed to a higher charge air pressure, with which it is supplied to cylinder inlets of the engine. The rotor of the electric motor may be a component of the air mover, it may even be identical with the air mover. However, the rotor of the electric motor may also be a separate component which is connected with the air mover for rotation therewith.

The air mover may form an integral part with the compressor impeller or with a part of the compressor impeller so that the air mover and the impeller are firmly interconnected for rotation in unison. In that case, the motion transfer path between the compressor impeller and the turbine wheel can be interrupted that is the movement of the compressor impeller including the air mover can be uncoupled from the movement of the turbine wheel.

It may, however, be advantageous to permit a relative rotational movement of the air mover with respect to the compressor impeller. In that embodiment, the rotor takes over the function of moving air through the compressor in addition, or in the alternative, to the compressor impeller. The movement of the air mover and of the compressor impeller can be uncoupled. There is basically an additional movement interruption possible in the motion transmission path between the compressor impeller and the turbine wheel.

The air mover is arranged preferably upstream of the compressor wheel in the inlet area of the compressor so as to form a pre-stage for the compressor wheel.

In an advantageous embodiment of the invention, the direction of rotation of the electric motor is reversible so that the electric motor can have a direction of rotation in the same sense as the turbine wheel or in the opposite sense. In this way, the work to be performed by the turbine can be supported by the electric motor when energized in the same direction of rotation as the turbine. When the electric motor is energized in the opposite direction, the air mover can be employed as a throttle, whereby a blocking effect occurs at the compressor inlet. Depending on the circumstances, even a vacuum can be generated at the air intake of the internal combustion engine by the air mover so that, in principle, a throttle valve in the air inlet duct of the internal combustion engine is not needed.

In the transmission path between the air mover and the urbine wheel, a clutch is preferably provided. In a first possible embodiment, the clutch is arranged between the air mover and the compressor impeller and, in a second possible embodiment, the clutch is disposed between the compressor impeller and the shaft or, respectively, between the turbine wheel and the shaft, wherein also a combination of the two possibilities is possible. A clutch arranged between the air mover which is in the form a pre-stage impeller (pre-charger) and the compressor impeller in the form of a separate component has the advantage that, with disengaged clutch, only the mass of the rotor and of the air mover have to be accelerated, whereas the masses of the compressor impeller, the shaft and the turbine wheel do not need to be accelerated by the electric motor. The masses to be driven by the electric motor can therefore be kept very small. With the air transport by the pre-charger, an increased intake air pressure can be achieved even when the compressor wheel is at a standstill or rotates at only very low speed. As soon as the compressor speed reaches the rotor speed of the electric motor, the clutch between the air mover and the compressor wheel can be engaged so as to rigidly interconnect the two components whereby the air mover is operated without energization of the electric motor. The energy needed for driving the charger/compressor is then provided exclusively by the exhaust gas back-pressure.

In the embodiment, in which a clutch is provided between the compressor impeller and the shaft or, respectively, between the shaft and the turbine wheel, the impeller can be disengaged from the turbine wheel. This embodiment is desirable for the arrangement, in which the air mover is integrated with the compressor impeller or is rigidly connected thereto for rotation therewith and wherein the air mover and the compressor impeller are to be movable independently of the turbine wheel.

In another advantageous embodiment of the invention, the clutch operating mechanism is coupled with the energization of the electric motor in such a way that the clutch is disengaged when the electric motor is energized, and is again automatically engaged when the electric motor is de-energized. With such a functional interconnection of the clutch operating mechanism and the energization of the electric motor, it is ensured that the least possible mass is to be accelerated by the electric motor upon its energization.

Various embodiments of the invention will be described below in greater detail with reference to the accompanying drawings.

DESCRIPTION OF VARIOUS EMBODIMENTS

Figure 1:
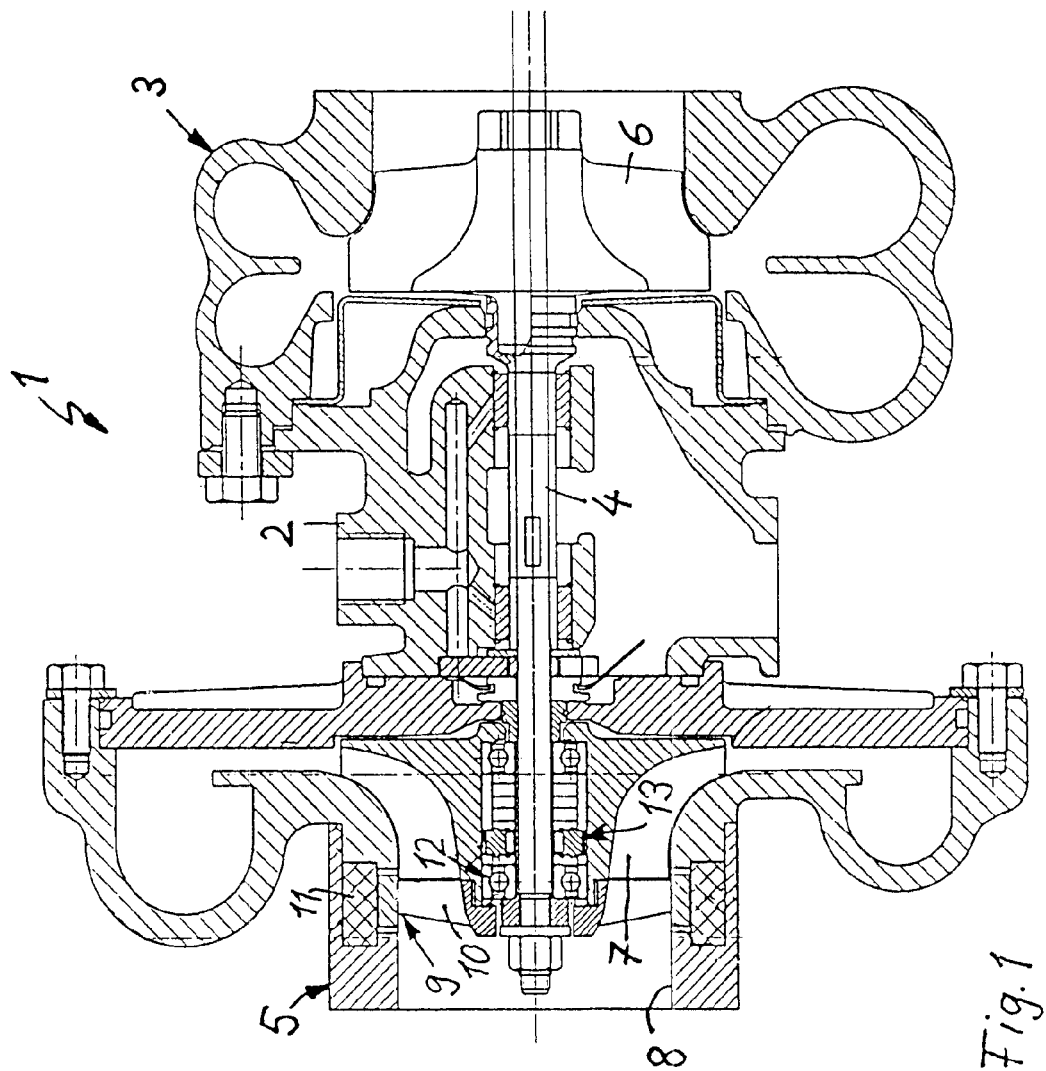
FIG. 1 is a cross-sectional view of an exhaust gas turbocharger whose compressor includes an impeller and an electric motor rotor in the form of a pre-stage air mover, wherein the pre-stage air mover and the compressor impeller are interconnected for rotation in unison, but can be uncoupled together from the charger shaft.

In the figures described in the following description, identical components are designated by the same reference numerals.

The exhaust gas turbocharger 2 as shown in FIG. 1 includes in a charger housing 2 an exhaust gas turbine 3 and a compressor 5, wherein the turbine wheel 6 of the exhaust gas turbine 3 is connected to the compressor impeller 7 by a shaft 4. During operation of the internal combustion engine, the turbine wheel 6 can be operated by the exhaust gases of the engine, which exhaust gases are still under pressure. The rotation of the turbine wheel is transmitted, by way of the shaft 4, to the compressor impeller 7, which sucks in combustion air by way of an inlet area 8 into the compressor and which compresses the combustion air to an increased pressure at which the combustion air is supplied to the engine.

To enhance the operation of the charger, particularly in its low load and low speed range in which a relatively low exhaust gas pressure is generated and in which therefore also only a correspondingly low charge air pressure can be generated, an electric motor 9 is provided at the compressor side. The electric motor 9 includes a rotor 10 arranged in the inlet area 8 co-axially with the shaft 4, or, respectively, the compressor impeller 7 and is surrounded by an armature 11. The electric motor 9 can be energized or deenergized depending on the actual state of the internal combustion engine or, respectively, the exhaust gas turbocharger. The rotor 10 of the electric motor 9 is in the form of an air mover, or respectively, a pre-stage air mover (fan) and is arranged, in flow direction of the air to be moved, upstream of the compressor wheel 7 in the inlet area 8.

The energization and de-energization of the electric motor occurs by the control signals from a control unit depending on the operating condition of the internal combustion engine and/or the exhaust gas turbocharger.

The rotor 10 of the electric motor 9 has a streamlined shape and moves the combustion air entering the inlet area 8 toward the compressor outlet when the rotor 8 of the electric motor 9 rotates in the same direction as the compressor impeller 7. The rotor 10 can operate independently of the compressor impeller 7, that is, it can operate in addition to the compressor impeller 7 for increasing the charge air pressure.

In the embodiment as shown in FIG. 1, the compressor impeller 7 and the rotor 10 are separate components, which are however interconnected for rotation in unison. The rotor 10 is disposed at the inlet end of the compressor impeller 7 on the hub thereof. The rotor 10 is supported co-axially with the axis of the shift 4, but not rotationally connected to the shaft 4.

The compressor impeller 7 is supported on the shaft 4 by way of a bearing 12 so as to be freely rotatable with respect to the shaft 4. A fixed connection between the compressor impeller 7 and the shaft 4 can be established by way of a clutch 13, which is arranged between the outer surface of the shaft 4 and the inner surface of a cylindrical space in the hub of the compressor impeller 7. When the clutch 13 is engaged, the compressor impeller 7, the rotor 10 and the shaft 4 are interconnected for rotation in unison. When the clutch 13 is disengaged, the shaft 4 with the turbine wheel on one hand, and the compressor impeller 7 and the rotor 10 on the other, can rotate independently of each other.

Figure 2:
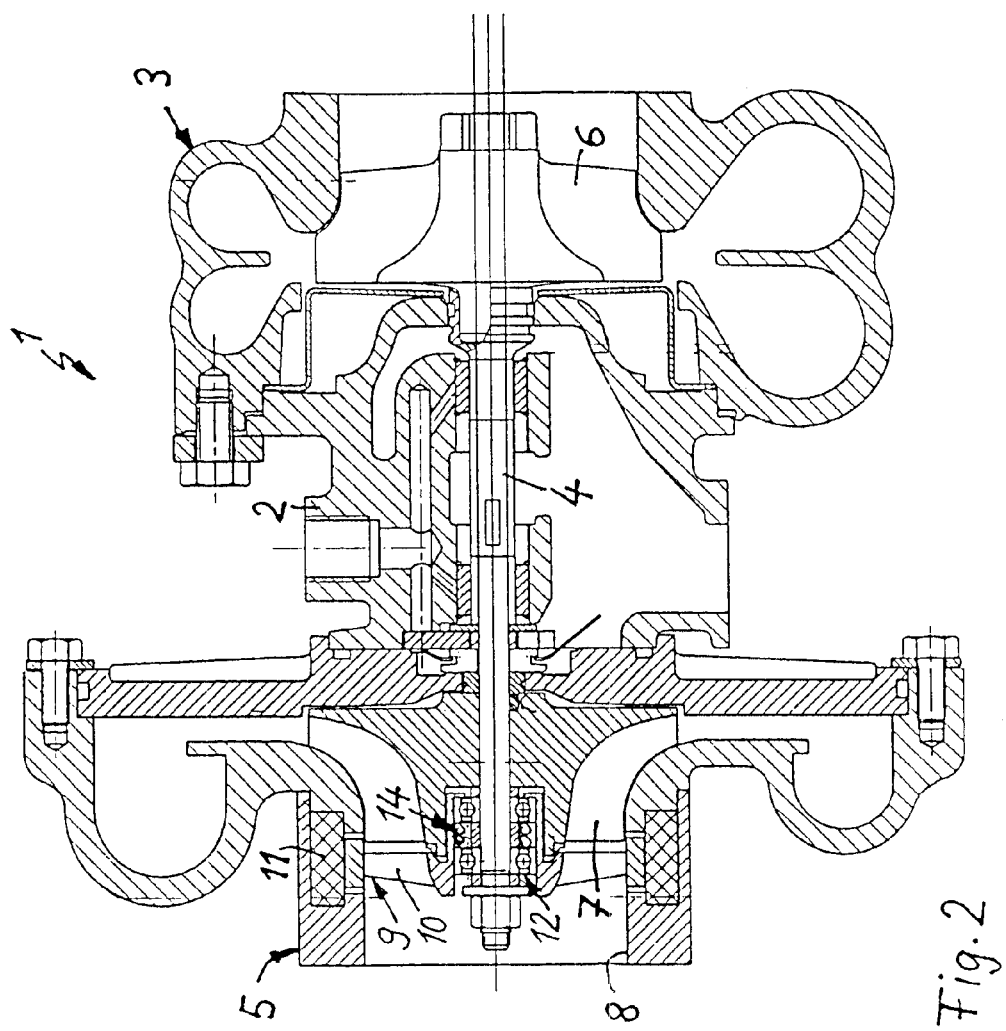
FIG. 2 shows a modified embodiment wherein the pre-stage air mover wheel can be uncoupled from the compressor impeller.

In the embodiment as shown in FIG. 2, the turbine wheel 6 and the compressor impeller 7 are firmly interconnected by way of the shaft 4. The rotor 10 of the electric motor 9 is again disposed in the inlet area 8 of the compressor 5 upstream of the compressor impeller 7 and forms a pre-stage air mover 9 (fan). The rotor 10 is rotatably supported on the shaft 4 by means of a bearing 12. Consequently, the rotor 10 can rotate independently of the shaft 4 and the compressor impeller 7.

The rotor 10 axially abuts a front-end side of the hub of the compressor impeller 7 and can be moved axially between a coupling position in which it is engaged with the impeller 7 in a form-locking manner and a free-wheeling position. The free-wheeling position is reached by an axial displacement of the rotor 10 away from the impeller 7. The rotor 10 is biased into its freewheeling position by a spring 14, so that it assumes its freewheeling position when the electric motor 9 is de-energized and remains unaffected by the rotation of the shaft 4—disregarding friction forces between the shaft 4 and the rotor 10.

The stator 11 in the charger housing 2 is so arranged with respect to the rotor 10 that, in the freewheeling position of the rotor 10 in which it is when the electric motor is de-energized, the rotor 10 is slightly outside its axial center position with respect to the armature 11. When the electric motor 9 is energized, an electromagnetic axial return force is generated which returns the axially movable rotor 10 to its axial center position with respect to the armature 11.

In this axial center position, the rotor is also engaged with the compressor impeller 7. As a result, the connection between the rotor and the impeller is interrupted when the electric motor is de-energized and is re-established upon energization of the electric motor so that the rotor and the impeller are then joined for rotation in unison.

Figure 3:
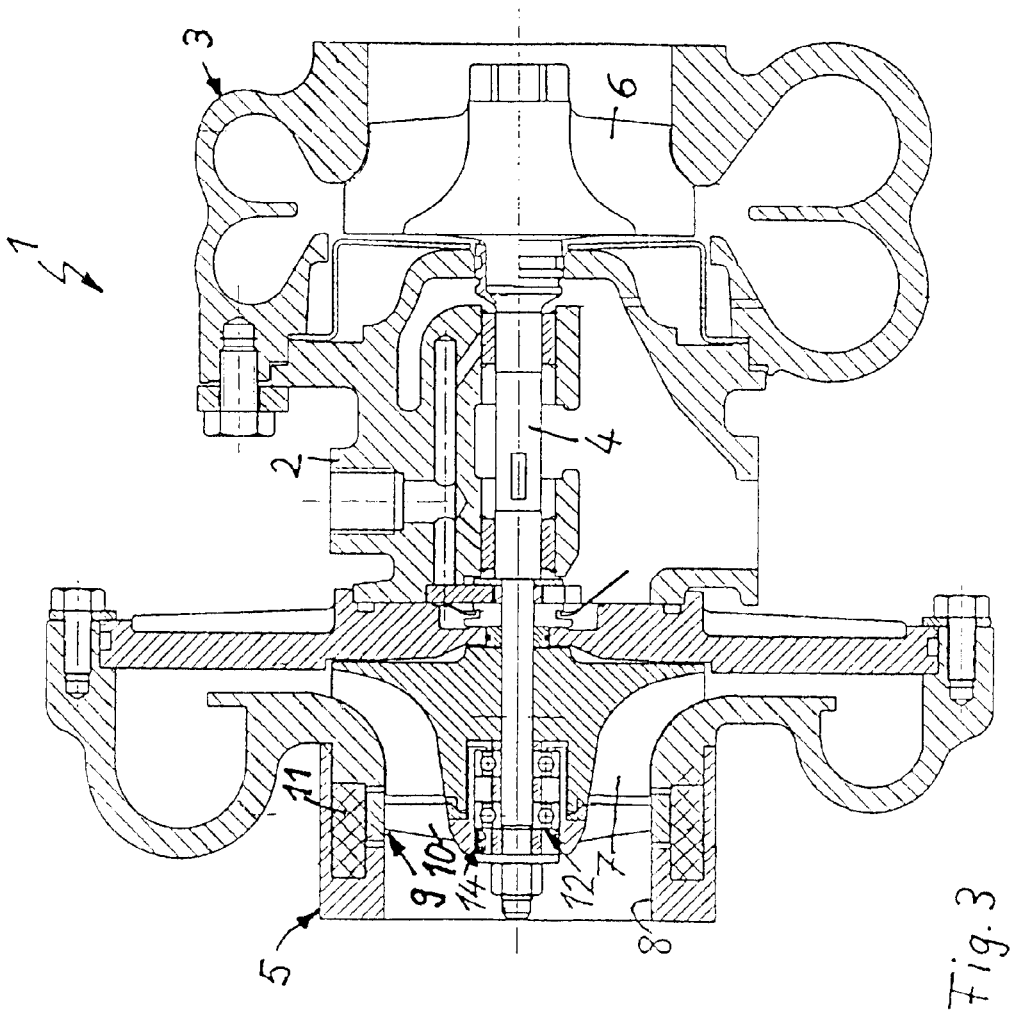
FIG. 3 shows an embodiment similar to that shown in FIG. 2, however, with a modified electric motor.

Also, in the exhaust gas turbocharger according to FIG. 3, the turbine wheel 6 and the compressor impeller 7 form a rotary unit, which is rotatable with respect to the rotor 10 of the electric motor under certain operating conditions of the internal combustion engine or, respectively, the exhaust gas turbocharger. The design corresponds essentially to that of the turbocharger shown in FIG. 2, however, with the difference that the spring 14 biases the rotor 10 axially into its coupled engagement position with the impeller 7. In this way, the rotor 10 is coupled with the impeller 7 for rotation therewith when the electric motor 9 is de-energized. In its coupling position, the rotor 10 is disposed in the armature 11 in the housing 2 in an asymmetric position so that, upon energization of the electric motor, an axial electromagnetic force is generated which moves the rotor 10 axially into a position, in which it is disposed centrally within the armature 11 where the rotor 10 is disengaged from the impeller 7 and is freewheeling. Consequently, the rotor 10 is coupled to the impeller 7 when the electric motor is de-energized and it is uncoupled from the impeller 7 when the electric motor is energized wherein the impeller 7 can rotate independently of the rotor 10.

Figure 4:
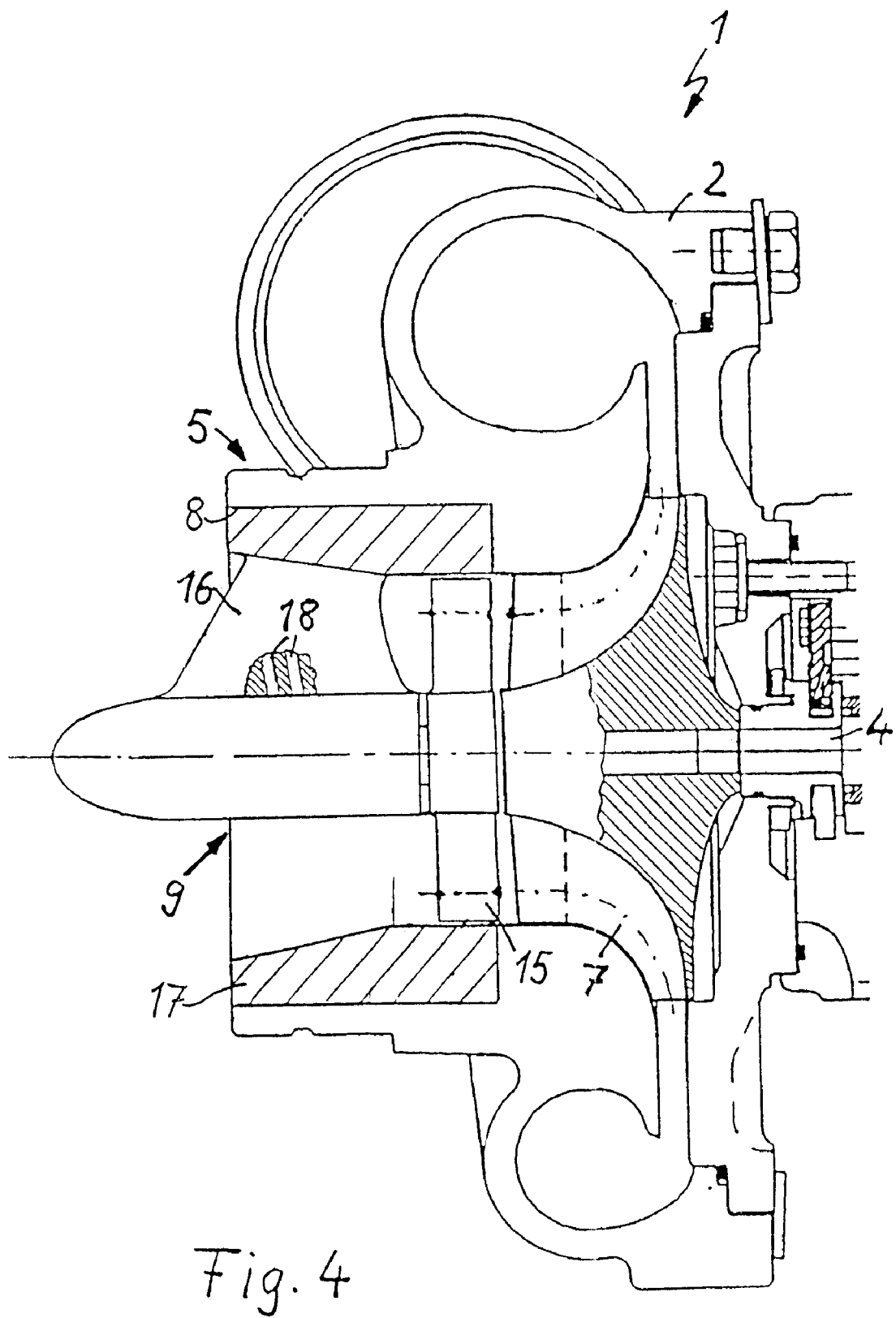
FIG. 4 shows a compressor with a pre-stage air mover, which is operated by an electric motor so as to be able to be operated independently of the compressor impeller.

In the exhaust gas turbocharger 1 according to FIG. 4, the shaft 4, the compressor impeller 7, and the turbine wheel form a unit for rotation in unison. In the inlet area 8 of the compressor 5, there is a stationary electric motor 9 whose rotor drives a pre-stage air mover 15, which is disposed immediately upstream of the impeller 7 and co-axially therewith. The pre-stage air mover 15 is connected only to the rotor of the electric motor 9. The pre-stage air mover can rotate independently of the impeller 7 and the shaft 4; there is no mechanical coupling between the pre-stage air mover 15 and the impeller 7 or the shaft 4. The electric motor 9 is connected by webs 16 to a support ring 17, which is fitted into the inlet channel of the compressor 5. The webs 16 are streamlined in shape and include electric signal and power lines by way of which the electric motor is controlled and energized. The electric motor 9, which is supported by the webs 16 on the support ring 17 forms together with the pre-stage air mover an integral building block, which may be installed into existing turbochargers as an aftermarket component.

During operation of the exhaust gas turbocharger 1, the pre-stage air mover can be driven, particular during low engine load and speed operation, by the rotor of the electric motor for increasing the charge air pressure. The speed of the pre-stage air mover 15 is determined in the low load and speed range of the engine by the charge pressure downstream of the compressor and is adjusted by the electric motor 9 independently of the speed of the turbocharger. At higher engine loads and speeds, where the power requirements of the charger can be satisfied by the exhaust gas turbine, the speed of the pre-stage air mover is preferably synchronized with speed of the compressor.

Figure 5:
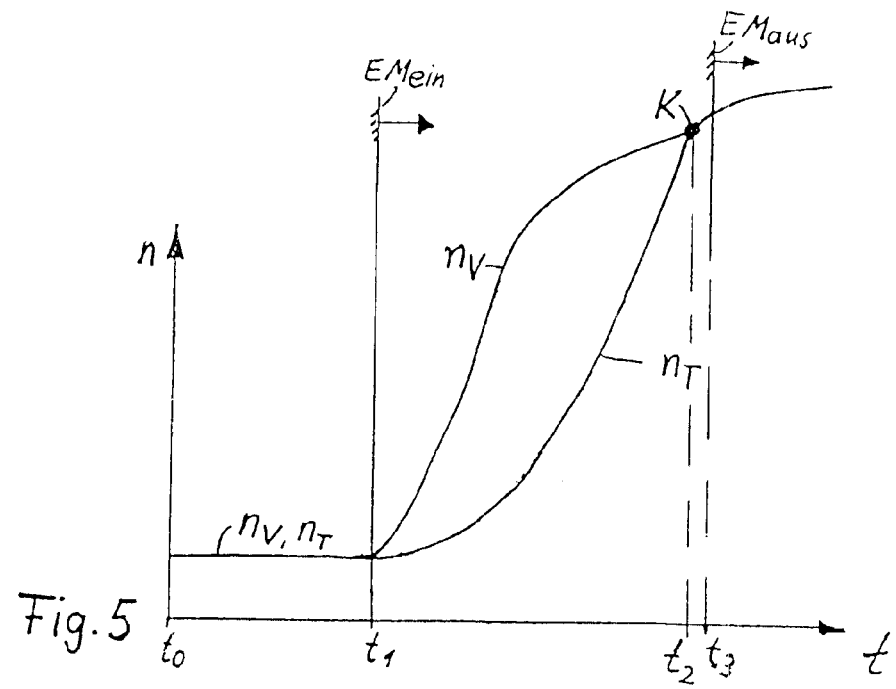
FIG. 5 shows a diagram representing the compressor speed and the turbine speed for an exhaust gas turbocharger according to the embodiment shown in FIG. 1.

FIG. 5 shows a speed (rpm)-over-time diagram with the speed curve $n_v$ for the compressor and the speed curve $n_T$ for the turbine of the exhaust gas turbocharger shown in FIG. 1 during acceleration. At the beginning during the period $t_0$ to $t_1$ the electric motor is de-energized; the turbine and the compressor of the exhaust gas turbocharger rotate at the same speed $n_T$ and $n_v$. At the time $t_1$, the electric motor is energized (indicated by $EM_{ON}$) . The speed $n_v$ of the compressor increases then to a speed higher than the speed $n_T$ of the turbine because of the independent support of the turbine and the compressor. The compressor is driven by the electric motor to a speed which is higher than the speed the turbine of the exhaust gas turbocharger reaches by the exhaust gas back pressure.

If the engine is accelerating the exhaust gas back pressure rapidly increases and, as a result, also the speed of the turbine. At the time $t_2$, the speed curves $n_v$ and $n_T$ of the compressor and, respectively, the turbine intersect in a coupling point K. At this point, a clutch disposed between the shaft of the exhaust gas turbine, which is operating with the turbine and the compressor impeller, is engaged so that the turbine, the shaft and the impeller are interconnected for rotation in unison. From this point on, the turbine and the compressor run at the same speed.

Immediately after the engagement of the clutch, that is, at a time $t_3$, the electric motor is de-energized (indicated by $M_{off}$). The compressor is now driven exclusively by the turbine.

Figure 6:
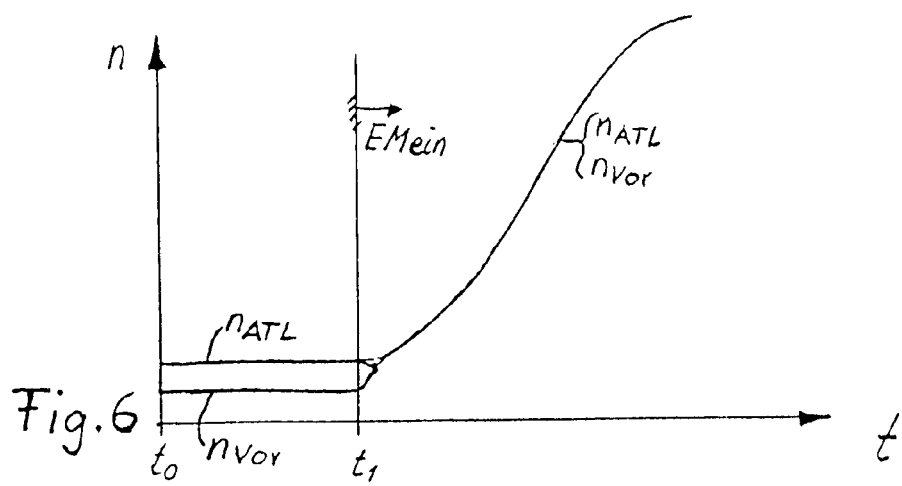
FIG. 6 shows a diagram corresponding to that of FIG. 5 for an exhaust gas turbocharger according to the arrangement of FIG. 2.

The speed over time diagram of FIG. 6 corresponds to an acceleration procedure for an exhaust gas turbocharger according to FIG. 2. In the period between $t_0$ and $t_1$, the electric motor is de-energized. The rotor of the electric motor, which forms the pre-stage air mover upstream of the compressor impeller, is disengaged from the compressor wheel and can rotate independently therefrom. The compressor impeller forms, together with the shaft and the turbine, a rigidly interconnected unit, which rotates at the speed $n_{ATL}$ of the turbocharger. The pre-stage air mover has a speed $n_{vor}$ different therefrom which in the example is somewhat lower than the charger speed $n_{ATL}$ because of friction.

At the time $t_1$, the electric motor is energized ($EM_{on}$) and the clutch between the pre-stage air mover and the impeller is engaged so that, now, the pre-stage air mover rotates at the same speed $n_{vor}$ as the impeller, the shaft and the turbine wheel, which rotates at the turbocharger speed $n_{ATL}$.

Figure 7:
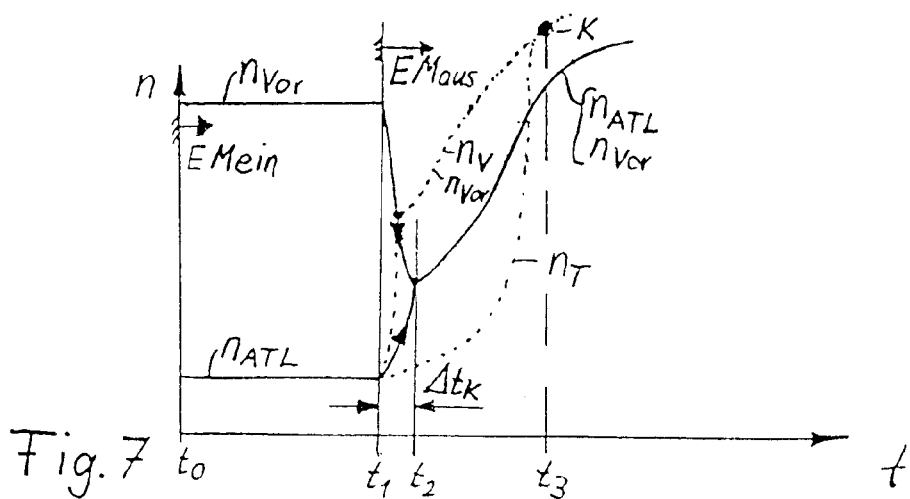
FIG. 7 shows a diagram corresponding to that of FIGS. 5 and 6 for an exhaust gas turbocharger according to the arrangement as shown in FIG. 3.

The speed over time diagram according to FIG. 7 corresponds to the exhaust gas turbocharger according to FIG. 3; it represents an acceleration procedure. In accordance with the curve shown in a solid line, the electric motor is energized at the time to ($EM_{on}$). At this point, the rotor of the electric motor, which forms the pre-stage air mover upstream of the compressor impeller, is disengaged and rotates, independently of the impeller, with the electric drive motor at a speed $n_{vor}$, which is significantly higher than that of the tuebocharger ($n_{ATL}$) with which also the impeller rotates. At the time $t_1$, the electric motor is de-energized whereby the rotor is engaged with the compressor wheel by spring force so that, after completion of the engagement, which occurs in the time period $\Delta t_K$ between the times $t_1$ and $t_2$, the pre-stage air mover rotates at the same speed $n_{vor}$ as the impeller, which rotates at the turbocharger speed $n_{ALT}$.

The curve shown in FIG. 7 as a dashed line represents a combination of the exhaust gas turbocharger according to FIG. 1 and FIG. 3. In this combination, a clutch is provided between the rotor of the electric motor and the compressor impeller and the shaft so that the compressor impeller can rotate independently of the shaft and the turbine and the rotor of the electric motor can rotate independently of the compressor impeller. During the startup period between $t_0$ and $t_1$, the electric motor is energized and drives the pre-stage air mover independently of the compressor impeller. At this point, the electric motor operates at a speed substantially higher than that of the impeller. At the same time, the clutch between the compressor impeller and the shaft is engaged so that the impeller, the shaft and the turbine rotate at the turbocharger speed $n_{ALT}$. Upon de-energization of the electric motor at the time $t_1$ also the clutch between the compressor impeller and the shaft is disengaged, so that the impeller now can rotate independently of the shaft and the turbine. Since, upon de-energization of the electric motor, also the clutch between the pre-stage air mover and the impeller is engaged, the impeller is, because of the higher speed $n_{vor}$ of the pre-stage air mover and the higher rotational energy of the pre-stage air mover, rapidly accelerated to a high rotational speed $n_v$, which exceeds the speed $n_7$ of the turbine and the shaft. Because of the increasing exhaust gas pressure, the turbine reaches at the time $t_3$ the same speed $n_T$ as the compressor impeller rotating with the speed $n_v$. At this point, that is the coupling point K, the clutch between the shaft and the compressor impeller is engaged so that, from this point in time ($t_3$) on, the turbine, the shaft, the compressor impeller and the pre-stage air mover form a unit for rotation in unison.

Figure 8:
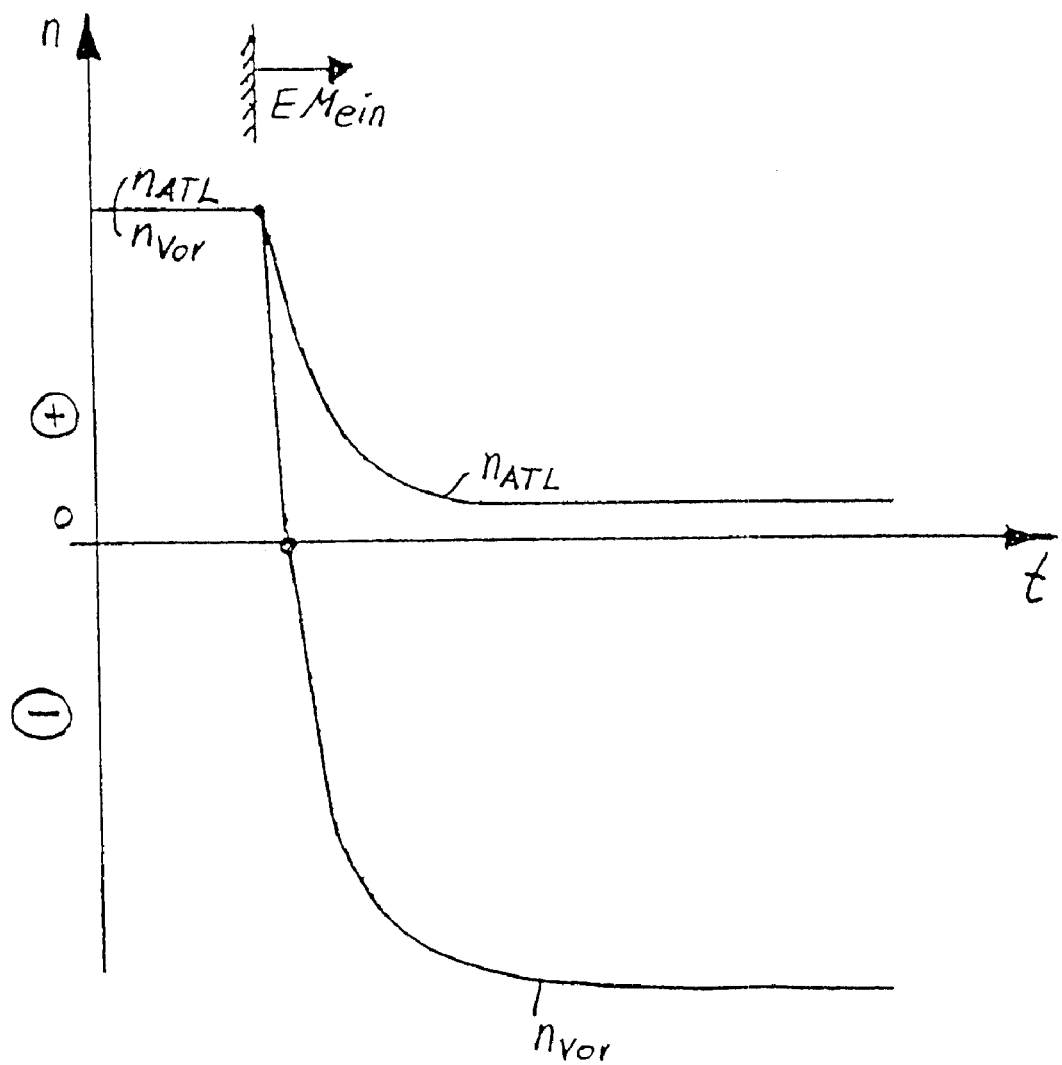
FIG. 8 shows another diagram representing the compressor speed and the pre-stage air mover speed during throttling operation of the pre-stage air mover.

In the speed-time diagram according to FIG. 8, the operation of the rotor of the electric motor as a throttling device is shown. The throttling effect is achieved specifically by a reversal of the direction of rotation of the rotor, or respectively, the pre-stage air mover of the electric motor. If the exhaust gas turbocharger is so designed that the clutch between the pre-stage air mover and the compressor impeller is disengaged when the electric motor is energized so that these two components can rotate independently of each other, the direction of rotation of the electric motor can be reversed by an appropriate control arrangement. This is indicated in FIG. 8 by a negative speed $n_{vor}$ of the pre-stage air mover beginning with the time of reverse energization of the electric motor $E_{ein}$. The reversal of the direction of rotation of the pre-stage air mover with respect to the compressor impeller provides for a blocking effect in the compressor inlet area wherein the amount of the blocking effect is controllable by the speed of the pre-stage air mover in the reverse direction.

What is claimed is:

1. An exhaust gas turbocharger for an internal combustion engine having an air intake duct and an exhaust duct, said exhaust gas turbocharger including a charger housing, a compressor with an impeller arranged within said charger housing in the intake duct of said engine and having an inlet area, an exhaust gas turbine with a turbine wheel arranged in said exhaust duct of said engine, a shaft rotatably supported in said charger housing and carrying said compressor impeller and said exhaust gas turbine wheel, and an electric motor supported in said charger housing and including a rotor arranged coaxially with said shaft, said rotor including an air mover structure arranged in the inlet area of said compressor, for rotation independently of the rotation of said compressor and said turbine.

2. An exhaust gas turbocharger according to claim 1, wherein said rotor with said air mover structure is a pre-stage air mover arranged upstream of said compressor impeller.

3. An exhaust gas turbocharger according to claim 1, wherein the direction of rotation of said electric motor is reversible.

4. An exhaust gas turbocharger according to claim 1, wherein a clutch is arranged between the air mover and the turbine wheel for selectively coupling said air mover for rotation with said turbine wheel.

5. An exhaust gas turbocharger according to claim 4, wherein the operation of said clutch and the energization of said electric motor are synchronized.

6. An exhaust gas turbocharger according to claim 5, wherein said clutch is disengaged when said electric motor is energized whereby said rotor and said air mover are rotatable independently of said turbine wheel and said clutch is engaged when the electric motor is de-energized for rotation of said rotor and said air mover in unison with said turbine wheel.

7. An exhaust gas turbocharger according to claim 5, wherein said clutch is engaged when said electric motor is energized whereby said rotor rotates together with said turbine wheel and said clutch is disengaged when said electric motor is de-energized and said rotor and said air mover are rotatable independently of said turbine wheel.

8. An exhaust gas turbocharger according to claim 1, wherein said air mover and said compressor impeller are interconnected for rotation in unison and a controllable clutch is arranged between the compressor impeller and said shaft.

9. An exhaust gas turbocharger according to claim 1, wherein said compressor impeller and said turbine wheel are interconnected for rotation in unison and a controllable clutch is arranged between said air mover and said compressor impeller.

10. An exhaust gas turbocharger according to claim 9, wherein said clutch between said air mover and said compressor impeller is engaged upon energization of said electric motor for rotation of said air mover together with said compressor impeller.

11. An exhaust gas turbocharger according to claim 1, wherein said air mover is constructed integrally with the rotor of said electric motor.

12. An exhaust gas turbocharger according to claim 1, wherein said electric motor is in the form of a hub motor and is disposed on the compressor impeller together with the air mover.

13. An exhaust gas turbocharger according to claim 1, wherein said electric motor and said pre-stage air mover are a unit which is exchangeably supported by said compressor impeller.

14. A method of operating an exhaust gas turbocharger for an internal combustion engine having an air intake duct and an exhaust duct, said exhaust gas turbocharger including a charger housing, a compressor with an impeller arranged in the intake duct of said engine, and having an inlet area, an exhaust gas turbine with a turbine wheel arranged in said exhaust duct of said engine, a shaft rotatably supported in said charger housing and carrying said compressor impeller and said exhaust gas turbine wheel, an electric motor supported in said charger housing and including a rotor arranged coaxially with said shaft, and an air mover arranged in the inlet area of said compressor said air mover being connected to said rotor of said electric motor for rotation therewith independently of the rotation of the turbine, said method comprising the step of controlling the speed of said pre-stage air mover relative to the speed of said compressor impeller by the energization of said electric motor so as to provide to the air admitted to said compressor impeller selectively one of a predetermined positive vector enhancing the air inlet flow into the impeller, an oppositely directed vector opposing the air inlet flow into the impelier and a vector-free admission of the air to the compressor impeller.

15. A method according to claim 14, wherein, during engine acceleration, the pre-stage air mover is driven by the electric motor at a speed exceeding that of the compressor impeller whereby, with a positive vector for the intake air entering the compressor, a rapid acceleration of the turbine is achieved.

* * * * *